(12) United States Patent
Kristjansson

(10) Patent No.: US 7,426,496 B2
(45) Date of Patent: Sep. 16, 2008

(54) ASSISTED FORM FILLING

(75) Inventor: Trausti T. Kristjansson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 414 days.

(21) Appl. No.: 10/792,519

(22) Filed: Mar. 3, 2004

(65) Prior Publication Data

US 2005/0198563 A1  Sep. 8, 2005

(51) Int. Cl.
*G06E 1/00* (2006.01)
*G06E 3/00* (2006.01)
*G06F 15/00* (2006.01)
*G06G 7/00* (2006.01)
*G06N 1/00* (2006.01)

(52) U.S. Cl. .................................................. 706/10
(58) Field of Classification Search .................. 700/1, 700/90; 706/1, 2, 6, 11, 15, 17, 18, 20, 45, 706/47, 50; 600/437; 707/3, 503; 345/335; 715/507, 500, 531, 505
See application file for complete search history.

(56) References Cited

U.S. PATENT DOCUMENTS

| | | | | |
|---|---|---|---|---|
| 5,664,109 A | * | 9/1997 | Johnson et al. | ............... 705/2 |
| 6,166,734 A | * | 12/2000 | Nahi et al. | ................. 715/748 |
| 6,411,313 B1 | | 6/2002 | Conlon et al. | |
| 6,542,635 B1 | * | 4/2003 | Hu et al. | ..................... 382/173 |
| 6,651,217 B1 | * | 11/2003 | Kennedy et al. | ............ 715/507 |
| 2002/0069220 A1 | * | 6/2002 | Tran | ........................... 707/503 |
| 2003/0199762 A1 | * | 10/2003 | Fritz et al. | ................. 600/437 |
| 2003/0225571 A1 | * | 12/2003 | Levin et al. | ................. 704/201 |

FOREIGN PATENT DOCUMENTS

WO  0221090 A  3/2002
WO  03030017 A2  4/2003

OTHER PUBLICATIONS

'BizCardReader 5.0' Owners Mannual :Anonymous, 1994-2003, Presto, pp. 1-21.*
'Lilac: A two view document editor': Brooks, 1991, IEEE, 0018-9162/91/0600, pp. 7-19.*
Trausti Kristjansson, et al., Interactive Information Extraction with Constrained Conditional Random Fields, American Association for Artificial Intelligence, Jul. 25-29, 2004, 8 pages.

(Continued)

*Primary Examiner*—David Vincent
*Assistant Examiner*—Peter Coughlan
(74) *Attorney, Agent, or Firm*—Amin, Turocy & Calvin, LLP

(57) ABSTRACT

Systems and methods are described that facilitate assisting a user in filling forms. The invention can parse untagged media, such as email, etc., to identify elements that can be employed to populate a form. Identified elements can be automatically inserted into corresponding fields in a form, and status indicators can be associated therewith and indicated to a user in order to alert the user that review of a particular field in the form is warranted. Additionally, the untagged media and the form can be concurrently presented to the user to facilitate user supervision and/or interaction during assisted form filling.

32 Claims, 11 Drawing Sheets

OTHER PUBLICATIONS www.hotcardtech.com/index.htm, 2003, 6 pages.

Christopher D. Manning, et al., Foundations of Statistical Natural Language Processing, 1999, The MIT Press, Cambridge, Massachusetts, USA.

Caron, et al., A Method of Detecting Objects Using Legendre Transform, RFAI team publication, Maghrebian Conference on Computer Science MCSEAI, Annaba (Algeria), May 2002, pp. 219-225.

Haenselmann, et al., Wavelet-based Semi-automatic Segmentation of Image Objects, Proc. Signal and Image Processing (SIP 2000), Las Vegas, 2000.

Jehan-Besson, et al., Region-based Active Contours for Video Object Segmentation with Camera Compensation, Proceedings of IEEE Int'l Conference on Image Processing, 2001, vol. 2, pp. 61-64.

Viola, et al., Robust Real-time Object Detection, CRL-2001/01, Feb. 2001.

Kim, et al., Shape Training for Video Object Segmentation, Int'l Workshop on Very Low Bitrate Video (VLBV) Coding, Oct. 2001, pp. 186-190.

Lee, et al., Learning Shapes for Automatic Image Segmentation, Proceedings of the INFORMS-KORMS Conference, Jun. 2000, Seoul, Korea, pp. 1461-1468.

Park, et al., Fast Object Tracking in Digital Video, IEEE Tram. Consumer Electronics, Aug. 2000, vol. 46, No. 3, pp. 785-790.

Roggero, Object Segmentation with Region Growing and Principal Component Analysis, Proceedings of the Photogrammetric Computer Vision ISPRS Commission III, Symposium, Sep. 9-13, 2002, Graz. Austria, pp. 289-294.

Shao, et al., Object Segmentation in Elevation Space Using Mathematic Morphology, Proceedings of the 22nd Asian Conference on Remote Sensing, Singapore, 2001, pp. 227-232.

Shioyama, et al., Segmentation and Object Detection with Gabor Filters and Cumulative Histograms, Proc. of the 10th Int'l Conference on Image Analysis and Processing (Venice), 1999, pp. 412-417.

Tieu, et al., Object Segmentation with Pixel Stacks, Artificial Intelligence Laboratory, Massachusetts Institute of Technology, 2001.

Yla-Jaaski, et al., Grouping Symmetrical Structures for Object Segmentation and Description, Computer Vision and Image Understanding, vol. 63, No. 3, May 1996, pp. 399-417.

Yu, et al., Concurrent Object Recognition and Segmentation by Graph Partitioning, Neural Information Processing Systems, Dec. 2002.

Anonymous, "BizCardReater Features", Jun. 2, 2001, Retrieved from the Internet, URL:http:/web.archive.org/web/20010803025823/bizcardreader.com/Features.htm#BizCardReader%20Features.

European Search Report mailed Dec. 21, 2006 for European Patent Application Serial No. 05 101 581.6 3 Pages.

* cited by examiner

ASSISTED FORM FILLING

TECHNICAL FIELD

The present invention relates generally to computers, and more particularly to systems and methods that facilitate completion of computer forms.

BACKGROUND OF THE INVENTION

The evolution of computers and networking technologies from high-cost, low performance data processing systems to low cost, high-performance communication, problem solving and entertainment systems has provided a cost-effective and time saving means to lessen the burden of performing every day tasks such as correspondence, bill paying, shopping, budgeting and information gathering. For example, a computing system interfaced to the Internet, via wire or wireless technology, can provide a user with a channel for nearly instantaneous access to a wealth of information from a repository of web sites and servers located around the world, at the user's fingertips.

Recent studies have shown that roughly 70 million workers (59% of working adults in the U.S.) regularly complete forms as a part of their job responsibilities. Of the 70 million workers, at least 25% regularly fill out electronic forms (e.g., on a computer), and that percentage grows daily. Thus, data entry into forms displayed on a computer monitor is a very common activity. Form filling can be tedious, time consuming, and highly susceptible to human error. Thus, there is an unmet need in the art for systems and methods that facilitate faster and more accurate form filling.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides systems and methods that facilitate assisting a user to quickly fill in computer forms via utilizing data that is available in untagged textual format (e.g., text in emails, web pages, and/or other computer-readable format). According to an aspect of the invention, a user can select untagged text from, for example, an email the user has received. Such untagged text can be displayed to the user in a text box in an untagged media graphical user interface (GUI), and can be parsed to identify elements of potential interest to the user in populating fields in a form. For instance, if the email contains items, such as names of persons, cities, and states, then such names can be identified as elements of potential interest. Additionally, such names can be placed in their corresponding fields in a form displayed to the user via a form GUI. The form GUI and the untagged media GUI can be displayed to the user concurrently.

According to another aspect of the invention, a user can verify that identified elements are accurately inserted into their corresponding fields in the form. For example, color indications can be employed to indicate a correlation between a particular element and a particular field in the form. For instance, when populating a contact list, untagged text that is recognized to be a first name can be highlighted in blue, and a corresponding "first name" field in the form can be presented to the user in blue. The user can drag and drop the highlighted first name into the first name field, or, more efficiently, the system can automatically insert the first name into its field.

According to a related aspect of the invention, status indicators can be associated with each field in a form in order to alert a user to any potential misplaced information. In this manner, the user can verify that identified elements are properly inserted into the correct fields. For example, an element such as "Lincoln" can be inserted into a "last name" field, but can also be inserted into a "city" field. A status indicator next to the field into which the name "Lincoln" is inserted can alert the user that verification is required as to the correctness of the insertion into the field. Status indicators can additionally employ color to visually alert the user to the status (e.g., the degree of importance of user verification, review, ... ) of the field information.

According to still another aspect of the invention artificial intelligence techniques and/or feedback/feed-forward information can be employed to facilitate increasing confidence levels of elements that are automatically inserted into form fields. For example, hidden Markov models are a type of probabilistic model that employs both hidden and observed random variables. Such models can be employed to increase the efficiency with which the present systems and methods insert untagged media elements into form fields. In this manner, user involvement can potentially be reduced to merely verifying that information in a form is correct before saving and printing the completed form.

According to yet another aspect of the invention, correction propagation can be employed to facilitate correction of various fields of information based at least in part on correction of a single field by a user. For example, information verified as being correct and/or corrected by a user can be evaluated to facilitate inferences regarding whether other information is correctly assigned to a given field. In this manner, correction of one field entry propagates to other fields.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
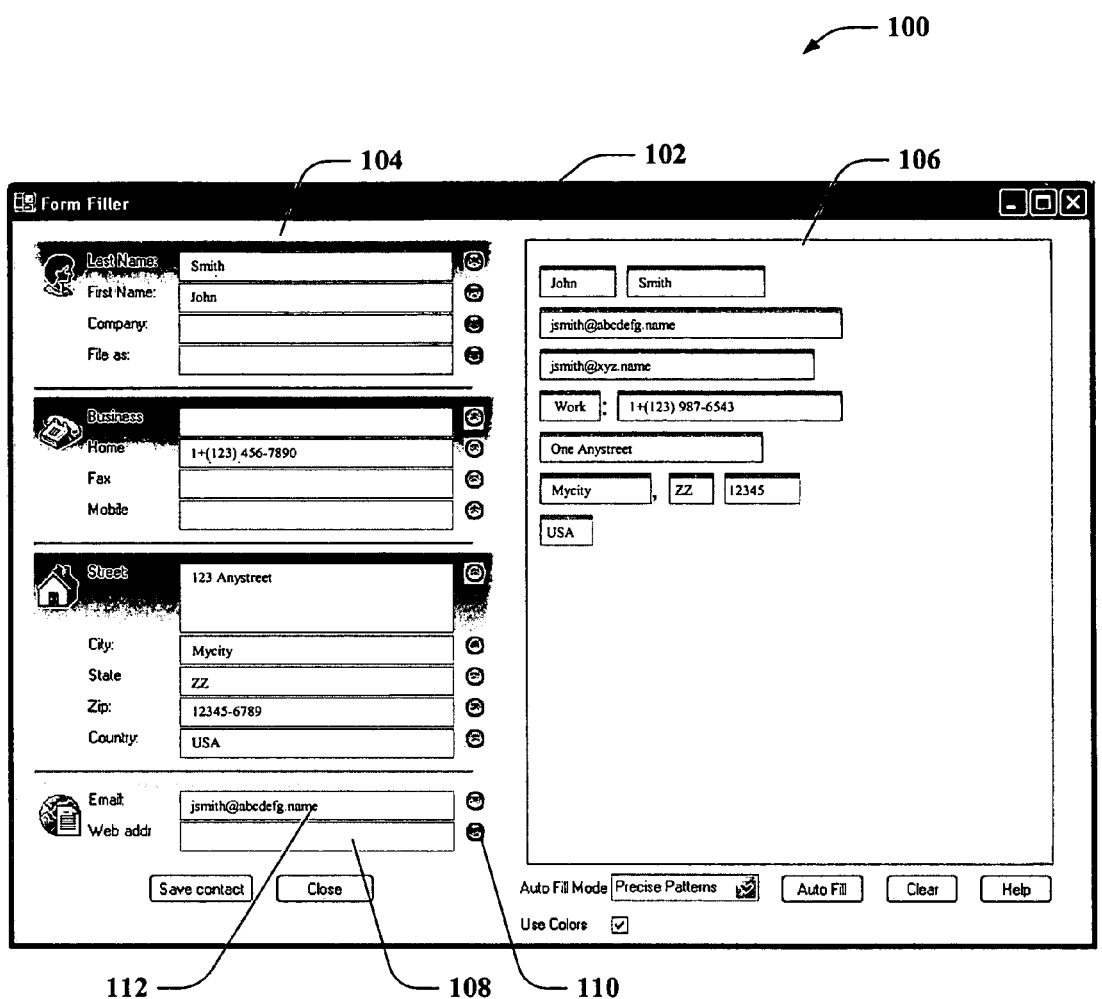
FIG. 1 is an illustration of a form-filling interface system 100 that facilitates assisting a user to populate fields in a form in accordance with an aspect of the invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Recent studies have shown that roughly 70 million workers (59% of working adults in the U.S.) regularly complete forms as a part of their job responsibilities. Of the 70 million workers, at least 25% regularly fill out electronic forms (e.g., on a computer), and that percentage grows daily. Thus, data entry into forms displayed on a computer monitor is a very common activity. Form filling can be tedious, time consuming, and highly susceptible to human error. In many cases, data that is employed to populate fields of a form can be readily available in a computer-readable format, such as in a text document, email, and/or web page. Techniques to identify and extract (e.g., parse) relevant information from such data are available, but are largely unreliable, and therefore are not particularly well-suited to directly populating databases or adding metadata. For example, Natural Language Processing techniques and/or other artificial intelligence (AI) techniques can identify specific types of information elements within computer-readable documents, such as names, addresses, phone numbers, etc., but such methods are not immune to error. The present invention permits users to enter data into electronic forms more quickly than can be done via conventional systems and methods. Moreover, the invention allows a user to efficiently enter information when untagged computer readable data is available by permitting the utilization of unreliable parsing technologies and permitting a user to visually verify and correct any errors made by the parser.

FIG. 1 is an illustration of a system 100 that facilitates assisted form filling of electronic forms. According to the illustration, a form filler interface (FFI) 102 is presented to a user to assist the user in filling the form via transferring untagged data into tagged data (e.g., XML-formatted data, . . . ), or to a database. The FFI 102 (also referred to herein as "the screen") comprises a form data graphical user interface (GUI) 104 (also referred to herein as "the form") and an untagged media GUI 106 (also referred to herein as a "text box"), which can be positioned adjacent to each other on the screen for user convenience. The form data GUI 104 comprises a plurality of fields 108, such that each field is reserved for a particular piece of information (e.g., last name, first name, street address, zip code, . . . ). A status indicator 110 can be operably associated with each field 108 in order to inform a user of a current status of information in the particular field. Additionally, a confidence indicator 112 can be associated with each field 108 to inform the user of a probability associated with the correctness of information in the field 108.

The FFI 102 illustrated in FIG. 1 exemplifies an interface for entering contact information. Initially, the form data GUI 104 (e.g., a typical contact information form, a goods and/or service order form . . . ) and an empty text box 106 are presented to the user. The user can copy a text segment into the text box 106 (e.g., via cutting and pasting from an email . . . ), and the system 100 can attempt to classify, or parse, the untagged data to identify elements within the untagged data. Once the untagged data has been parsed, the system 100 can fill in the fields 108 of a form 104 on a computer terminal with identified elements. The original untagged data in the text box 106, and the form 104, can be simultaneously displayed on the screen 102, and the untagged data can be augmented to visually indicate associations (e.g. using color coding . . . ). For example, the system 100 can utilize a purple color to indicate that certain elements in the untagged text have been used to populate the address fields in the form 104. According to the example, a separate color (e.g., orange) can be employed to indicate that the system 100 has determined that specific text is potentially of interest, but that the confidence level is not high enough to assign it to a field, and, therefore, a user can make a determination of whether the specific text should be assigned to a particular field.

According to a related aspect of the invention, a user can fill in a portion of a form, and the system 100 can search through available untagged computer-readable media, locate potential field-entry candidates, display the located documents and/or elements, and fill in the remaining fields of the form. In this manner, a partial Autofill can be performed.

A user can quickly verify the correctness of the parsing. If the parse has errors, the user can correct them (e.g., by dragging the element from the untagged text and dropping it on the corresponding field in the form, by typing directly into a field, by correcting text in the text box 106, etc). Additionally, parsing protocols can take advantage of side information, such as corrections or additions provided by the user. For example, if the user has entered information into a field or corrected an initial parse, the user can instruct the system to reparse the untagged text and rely on the side information provided by the user (by clicking on a button marked 'Auto Fill' in FIG. 1). To further the present example, the name "Charles Stanley" suggests that "Charles" is the first name and that "Stanley" is the last name of a particular contact. However, a user can recognize that the first and last names of the contact have been transposed, whether by accident or otherwise, and can employ the drag-and-drop technique described above to move "Stanley" into the first name field. Additionally, fields can be provided with drop-down menus, such that where the untagged data displayed in the text box contains more than one first name, for example, one of the first names can be displayed in the first name field and the other can be provided in the drop-down menu, so that a user can simply open the menu (e.g., click on, hover over, . . .) and select an alternate name if the field requires correction.

Upon this action, the system can automatically move "Charles" into the last name field, reducing the number of user actions required to populate the form while increasing the confidence level for the last name field, based on the fact that the user verified that "Stanley" is the first name of the contact and, therefore, is not the last name of the contact. Such automated post-user-action field filling is an example of correction propagation.

In some cases, it can be advantageous to allow the user to specify which fields can be used as side information (e.g., information in fields filled and/or corrected by the user, . . .) and which fields the system is allowed to overwrite (e.g., fields that do not contain side information, . . . ). Such permissions can be facilitated via the status indicators 110, which can indicate that a user has not acted on the field, or has verified, corrected, and/or entered information into the field. The status of each field can be, for example, "unfilled and unverified," "filled automatically but unverified," or "user-or-automatically filled and verified."

For example, a field that is "unfilled and unverified" can have a status indicator 110 of a first color (e.g., red). If the system 100 fills the field (e.g., the field is automatically filled) then the status indicator can be upgraded to a second status indicator color (e.g., yellow) to alert the user that the field has been automatically filled but is unverified. Such an indicator can alert the user to a condition that requires user verification, but not necessarily correction, as in the "Charles Stanley" example, supra. If the user verifies that the information in the field is correct, the status indicator can be upgraded to a third color (e.g., green) to indicate a status of "filled and verified." To further this example, if the user enters information into a field having a red status indicator, then the status indicator can be upgraded directly to green, because the user has filled the field and verified the information to be correct by doing so. Thus the field is now "filled and verified." Furthermore, the confidence of another field(s) can be updated and/or improved via user verification and/or correction of the first field. For instance, in the "Charles Stanley" example, both first name and last name fields can have a yellow status indicator if it is unverified which name is the first name and/or which name is the last name. If the user verifies that "Charles" is the correct first name, then the system 100 can upgrade the status of the first name field to "(user-) filled and verified" (e.g., with a status indicator color of green). Because the user has verified that "Charles" is the first name (and therefore not the last name), the system can retain "Stanley" in the last name field, and thus the confidence indicator for the last name field can be upgraded from yellow to green (e.g., automatically filled and verified) as well.

According to a related aspect of the invention, a color-coded confidence indicator 112 can be associated with a particular field 108 (e.g., a border color of the field, a background color of the field and/or text, etc.). For instance, a field that is difficult for the system 100 to fill with a high confidence factor can be labeled according to a color scheme that can indicate to a user that information in the field is less than a desired confidence threshold. Confidence indicator(s) can represent a value from 0 to 1, in different shades of color. Furthermore, the confidence indicator 112 in this example can be, for instance, a solid indicator, a blinking indicator, an indicator that fades in and out of full brightness, contrast, etc., or any other suitable indicator scheme that can indicate varied levels of confidence regarding the field(s) in question.

According to one example, a piece of information comprising an "@" or ".com" can be automatically inserted into an "email" field in the form. Similarly, a piece of information having the format (nnn) nnn-nnnn, nnn-nnn-nnnn, nnn-nnnn, etc., where n is an integer, can be automatically inserted into a phone-number field with a high degree of confidence. It is to be appreciated that high-confidence indicia can be associated with other types of information with regard to the field into which such information can be inserted, and that automatic insertion of such information is not limited to email and/or phone number fields.

Figure 2:
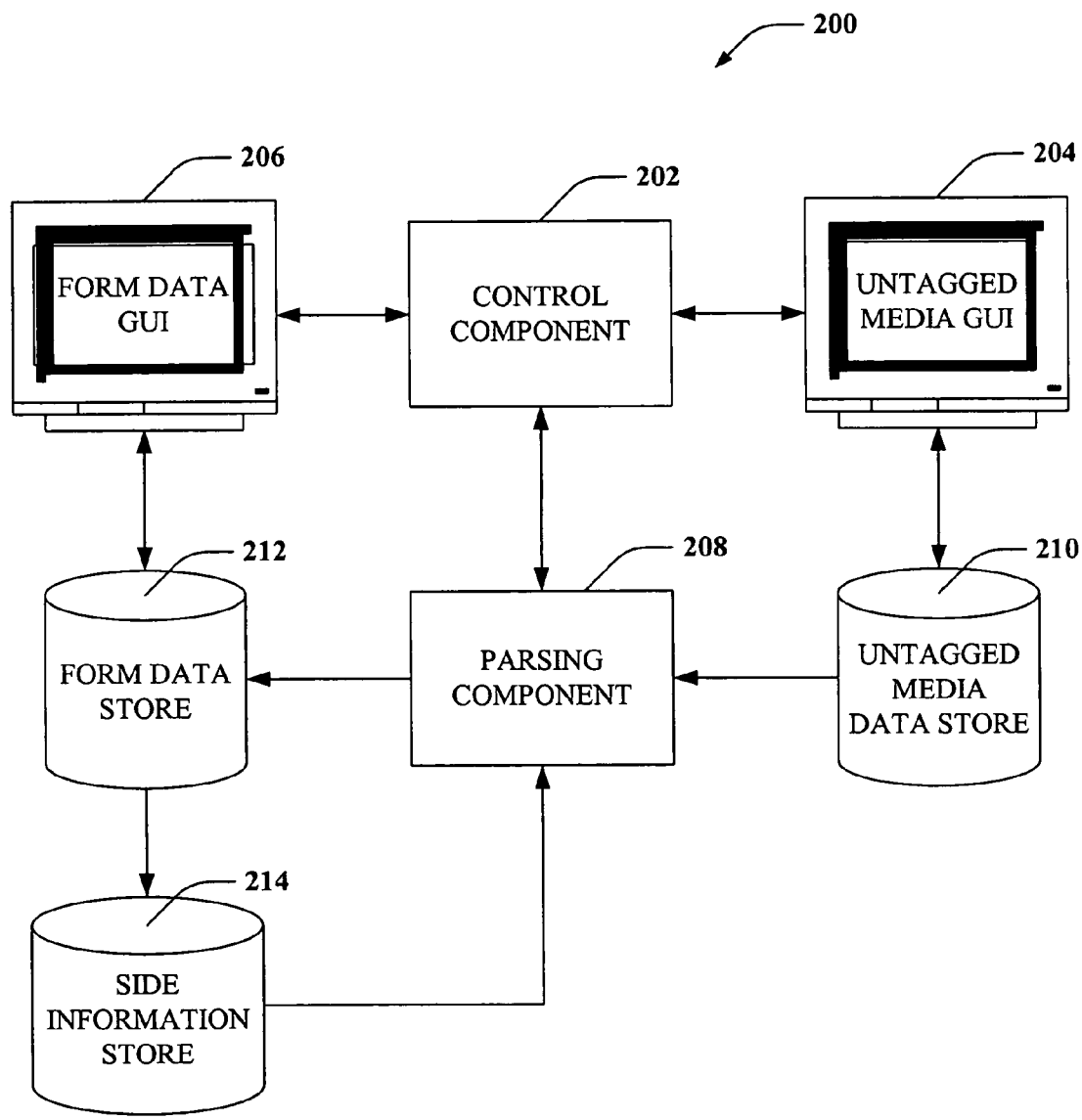
FIG. 2 is an illustration of a system 200 that facilitates assisted form filling in accordance with an aspect of the present invention.

FIG. 2 is an illustration of a system 200 that facilitates assisted form filling comprising a control component 202 that is operatively coupled to each of an untagged media GUI 204, a form data GUI 206, and a parsing component 208. The control component 202 can receive and analyze untagged data in order to facilitate populating fields in a form. Such untagged data can be presented to the user via the untagged media GUI 204. The untagged data can be, for example, an email excerpt pasted into the untagged media GUI 204 by the user. Upon pasting the untagged data into the untagged media GUI 204, the data can be stored in an untagged media store 210. The parsing component 208 can parse the untagged data stored in the untagged media data store 206 to determine potential form filler data (e.g., proper nouns such as names, numerical data sets such as addresses, phone numbers, zip codes . . . ), which can then be stored in a form data store 212. Data stored in the form data store 212 can be employed to populate fields in the form, and presented to the user via the form data GUI 206. As described with respect to FIG. 1, the user can then verify and or correct individual fields in the form, and such verifications and/or corrections can be stored as side information in the side information store 214. The parsing component 208 can employ stored side information to update the form data store 212 according to verifications and/or changes made by the user. In this manner, text classification and/or labeling can be updated, which permits status levels associated with the automatically filled fields to be upgraded in response to user verification and or correction of fields.

It will be appreciated that the data stores (e.g., memories) components described herein can be either volatile memory or nonvolatile memory, or can include both volatile and non-volatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory of the present systems and methods is intended to comprise, without being limited to, these and any other suitable types of memory.

Figure 3:
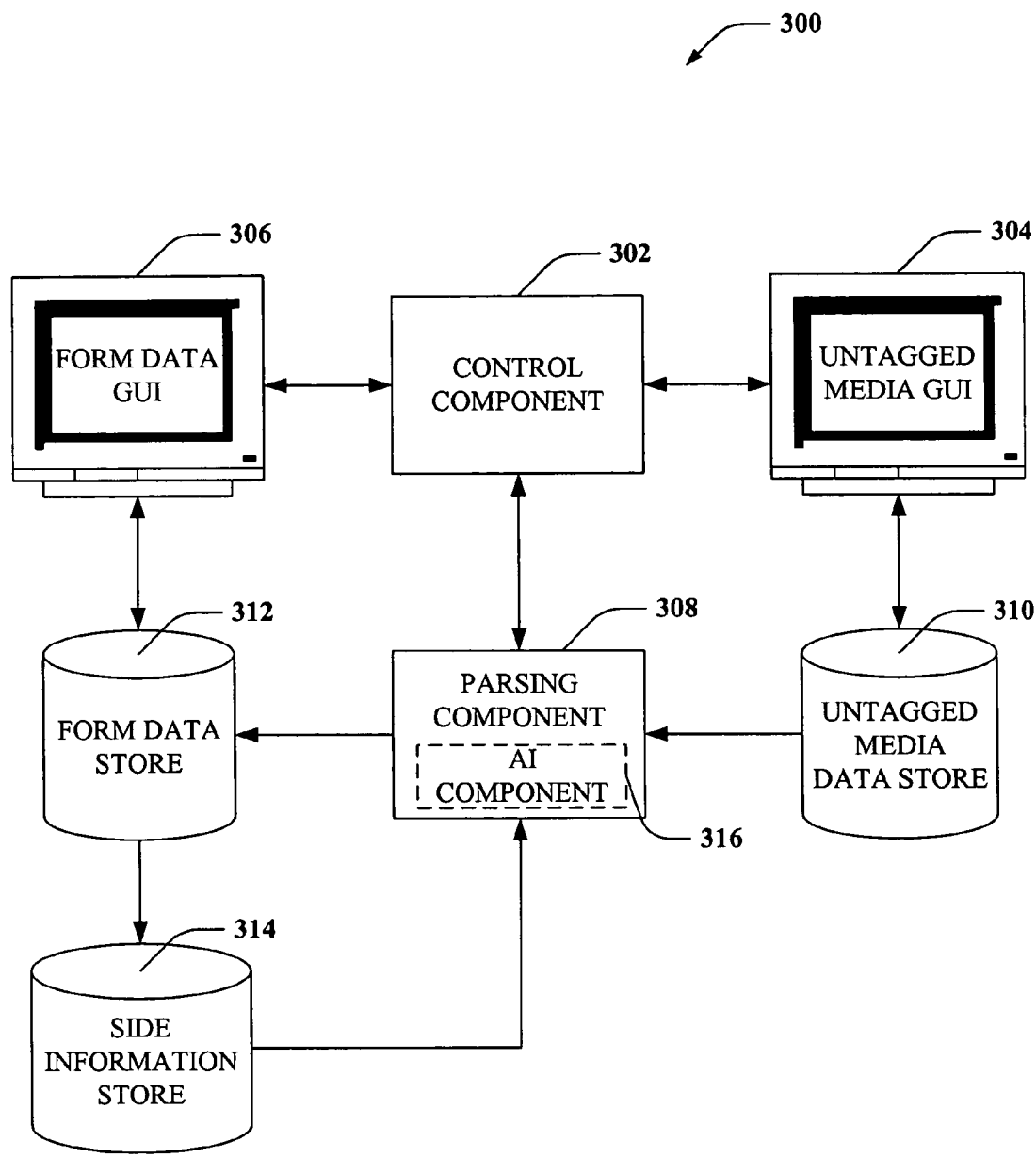
FIG. 3 is an illustration of a system 300 that comprises an artificial intelligence component to facilitate assisted form filling in accordance with an aspect of the present invention.

FIG. 3 is an illustration of a system 300 that facilitates assisted form filling in accordance with an aspect of the invention and in a manner similar to that described above with reference to FIG. 2. The system 300 comprises a control component 302 that is operatively coupled to each of an untagged media GUI 304, a form data GUI 306, and a parsing component 308. The control component 302 analyzes untagged data in order to populate fields in a form. Such untagged data can be presented to the user via the untagged media GUI 304. The untagged data can be, for example, an email excerpt pasted into the untagged media GUI 304 by the user. Upon pasting the untagged data into the untagged media GUI 204, the data can be stored in an untagged media store 310. The parsing component 308 can parse the untagged data stored in the untagged media data store 306 to determine potential form filler data (e.g., proper nouns such as names, numerical data sets such as addresses, phone numbers, zip codes, . . . ), which can then be stored in a form data store 312. Data stored in the form data store 312 can be employed to populate fields in the form, and presented to the user via the form data GUI 306. As described with respect to FIG. 1, the user can then verify and or correct individual fields in the form, and such verifications and/or corrections can be stored as side information in the side information store 314. The parsing component 308 can employ stored side information to update the form data store 312 according to verifications and/or changes made by the user. In this manner, confidence levels associated with the automatically filled fields as well as text and classification labeling can be updated in response to user verification and or correction of fields to facilitate correction propagation. Additionally, the parsing component 308 is operatively coupled to an artificial intelligence (AI) component 316 that can make inferences regarding a most appropriate field into which a particular piece of data can be entered.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject invention. Furthermore, inferences can be made by the present invention, based upon, for example, hidden Markov models (HMM), as will be discussed in reference to FIG. 4, infra.

Figure 4:
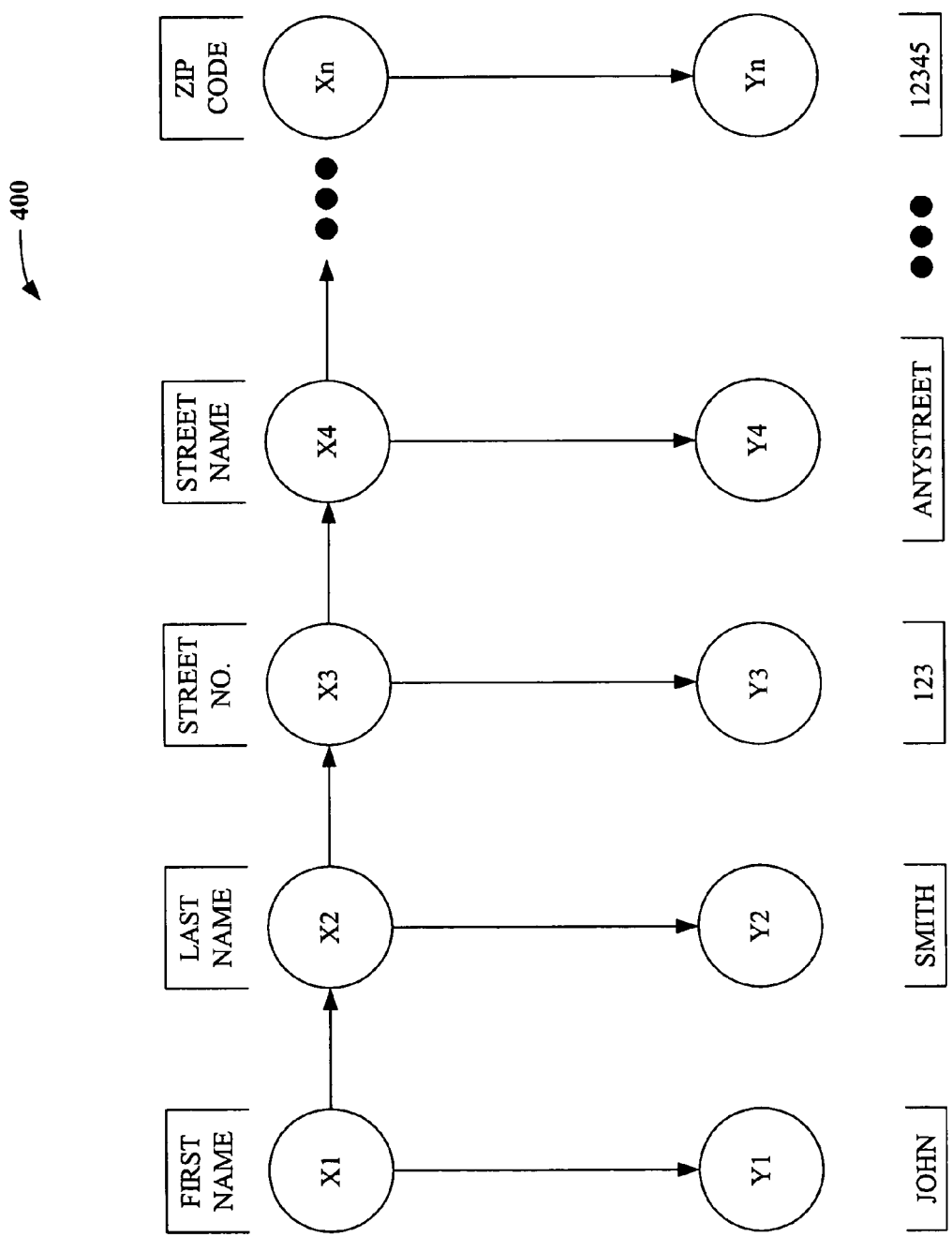
FIG. 4 is an illustration of an exemplary hidden Markov model 400 that facilitates assisting a user to populate fields in a form.

FIG. 4 is an illustration of a schematic 400 in which HMMs are employed to facilitate assisted form filling in accordance with an aspect of the present invention. HMMs and other probabilistic models can be employed to "back-channel" information from a user interface to a parser in order to facilitate correction propagation, which permits correction of neighboring fields when a single field is corrected by a user. An HMM is a variant of a finite state machine having a set of states, Q, an output alphabet, O, transition probabilities, A, output probabilities, B, and initial state probabilities, Π. The current state is typically not observable. Instead, each state can produce an output with a certain probability, B. Usually the states, Q, and outputs, O, are understood, so an HMM is said to be a triple, (A, B, Π), with the following properties:

$$A=[a_{ij}=P(q_j \text{ at } t+1|q_i \text{ at } t)],$$

where $P(a|b)$ is the conditional probability of a given b, $t \geq 1$ is time, and $q_i \in Q$.

Informally, A is the probability that the next state is $q_j$ given that the current state is $q_i$.

$$B=[b_{ik}=P(o_k|q_i)],$$

where $o_k \in O$.

Informally, B is the probability that the output is $o_k$ given that the current state is $q_i$.

$$\Pi=[p_i=P(q_i \text{ at } t=1)].$$

According to FIG. 4, various random variables $X_1$ through $X_n$ are illustrated, which can represent fields in a form. Such fields can be part of the set of fields comprising {first name, suffix, last name, street address number, street name, city, state, zipcode, phone number(s), email address(es), . . . }. It is to be understood that the set of X fields and the information pieces Y that can be entered therein are not limited by the above-described exemplary information fields, but rather can comprises any other suitable pieces of information and/or fields there for. Y can represent the actual information piece corresponding to a given X, such that if $Y_1$ equals "John," and if $X_1$="first name" is true (e.g., $P(X_1$=first name)=1), then "John" can be inserted into the represented by $X_1$. Similarly, if $Y_2$="Smith" and $X_2$="last name" is true, then "Smith can be inserted into the field associated with $X_2$. Thus, while the value of Y is observed, X remains hidden. Typically, a probability distribution will be observed (e.g., $P(X_1$=first name) =0.23, $P(X_1$=last name)=0.03, $P(X_1$=city name)=0.093, etc.), such that a label exhibiting the highest score (e.g., "first name," according to this example) can be chosen. Such inferences facilitate finding the best setting of the hidden variables. In the case of Hidden Markov models, the most likely states sequence can be found. For example:

$$\arg\max_{x_1,\ldots,x_n} p(Y_1 \ldots Y_n | X_1 = x_1, \ldots X_n = x_n)$$

According to a similar example, a particular X might have associated with it a condition "5 digits," such that if a Y has seven digits (e.g., 555-1234) then it will register a low probability (e.g., $P(Y$=555-1234$|X)$=0.00001) for the particular X in question. Conversely, a Y comprising information such as 12345 will register a high probability (e.g., $P(Y$=555-1234$|X)$=0.9989) for the particular X and can be inserted in the associated field in the form. Similarly, the seven-digit Y described above will register a high probability outcome for an X having the condition "7 digits." The present invention can employ any number of suitable variables, or tests, to determine which particular Ys satisfy conditions associated with particular Xs in order to facilitate assisted form filling.

The invention can capitalize on advantages of probabilistic models, such as the HMM described above, which contain hidden and observed random variables, by setting hidden variables (Xs) to states corresponding to labels of particular fields. For example, the Y random variables in the HMM described above are "observed" random variables, where each variable corresponds to one token. A token is a segment of text between token delimiters (e.g., spaces, dashes, commas, etc.). For example, the text string "this-is a, test" would be tokenized as:

"this"=token 1
"is"=token 2
"a"=token 3
"test"=token 4

1The hidden variables, Xs, represent the probability that the tokens have each of the permitted labels (e.g., the tokens are distributed over the labels). In the field of information extraction, most often, the X's remain unobserved, since "side information" is not used. To force a probabilistic model to use side information (e.g. in the form of a text field with user supplied text), a token corresponding to the user supplied text can be searched for and the corresponding hidden variable X can be set to the state corresponding to the label of the field. This can be viewed as setting p(X1=First Name)=1 and P(X1=LastName)=0, etc., and not updating during inference. For example, if the user typed "Smith" into the last name field of the form, a search can be performed through all tokens to find "Smith." Then, set p(X2=LastName)=1, and do not update the probability distribution for P(X2) during inference.

Correction propagation can further be achieved back-channeling information from a user interface to the parser. In such a manner, neighboring fields can be populated when a single field is corrected by a user. For example, the invention can employ a rule-based parsing method wherein a simplified version of a rule states "if LastName field is set by the user, then search for the last name in the untagged text and label the word immediately preceding the last name as a first name." There can also corresponding rule for first names. In this manner, correction of the last name "propagates" to the first name. It is to be understood that correction propagation as described herein is not limited to first and last names, but rather can be applied to any and all relevant types of information, text, etc.

Additionally, the invention can employ conditional random fields (CRFs), which are a generalization of both HMMs and maximum entropy models. CRFs allow for the introduction of arbitrary non-local features and capture the dependencies between labels, permitting confidence of the parsed pieces of information to be estimated. In this manner, the present invention can automatically assign a parsed piece of information to a field when the information has a high confidence level, and can flag a piece of information having a low confidence level for user review and/or correction.

Figure 5:
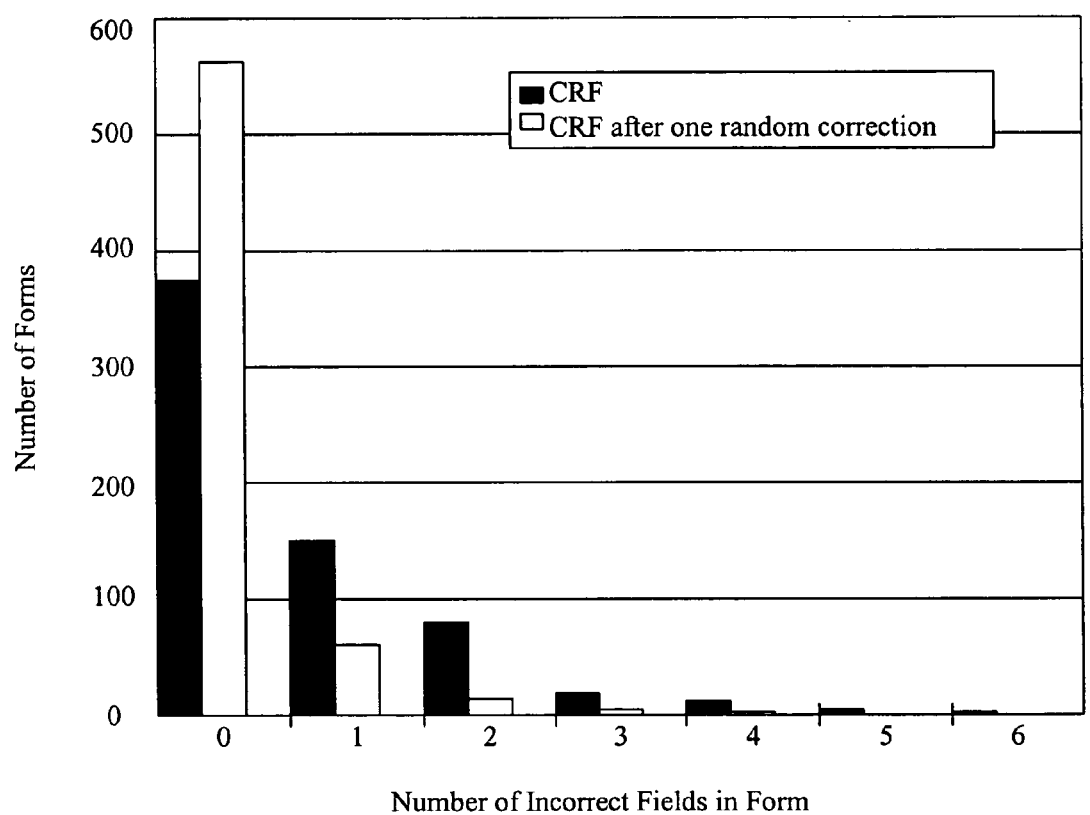
FIG. 5 is a histogram 500 that illustrates the efficiency of invention in assisting a user to populate a form.

FIG. 5 is an illustration of a histogram 500 that shows a relationship between CRFs before and after a random incorrect field has been corrected. During form filling, user behavior with regard to field verification and correction can be anticipated and/or modeled via a number of user interaction models (UIM). For example, in a simple scenario, UIM1 a user can be presented with an autofilled form and can be required to correct all errors (e.g., correction propagation is not performed). Thus, the number of user actions required equals the total number of errors that occurs during automatic filling.

According to a second scenario, UIM2, an initial automatic field assignment is assumed, and a user performs a single, randomly chosen correction, based upon which the system can initiate correction propagation. Such can be iterated until all fields are correct.

According to a third scenario, UIM3, an initial automatic field assignment is assumed, and a user performs a correction on the least confident incorrect field. For example, the user can be visually alerted to the fields in order of confidence (e.g., by confidence indicators, . . . ) until an error is found. Correction propagation can be performed in accordance with the correction of the least confident field, and the user can be prompted to correct any remaining errors.

Form filling typically requires perfect accuracy. Thus, benefits can be realized whenever filling time is reduced, cognitive load on a user is reduced, or both. The invention employs an efficiency measure, called the expected number of user actions (ENUA), in addition to other standard performance measures. ENUA is defined as the number of user actions (e.g., clicks, . . . ) required to correctly fill all fields in a form. The ENUA can vary depending on the UIM, as discussed above. To express the ENUA, the notation P(i;j) is used, which is the probability distribution over the number of errors j after i manual corrections. Such distribution is represented by the histogram of FIG. 5.

Under UIM1, for example, the ENUA is:

$$ENUA = \sum_{n=0}^{\infty} nP(0;n)$$

Where P(0;n) is the distribution over the number incorrect fields (see FIG. 2).

According to models UIM2 and UIM3, for example, ENUA is:

$$ENUA^1 = (1 - P(0;0)) + \sum_{n} nP(1;n)$$

Where P(0;0) is the probability that all fields are correctly assigned initially and P(1;n) is the distribution over he number of incorrect fields in the form after one field has been corrected. Different distributions can result depending on which UIM is employed. The superscript 1 on $ENUA^1$ indicates that correction propagation has been performed once.

Still referring to FIG. 5, forms are grouped according to the number of fields containing errors in each form. Solid bars indicate the result of utilizing a CRF based parser before any correction(s), and hollow bars indicate the distribution after one random incorrect field has been corrected. Such information can be utilized to estimate P(0;n) and P(1;n) respectively.

While, for purposes of simplicity of explanation, the one or more methodologies shown herein, e.g., in the form of a flow chart, are shown and described as a series of acts, it is to be understood and appreciated that the present invention is not limited by the order of acts, as some acts may, in accordance with the present invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Figure 6:
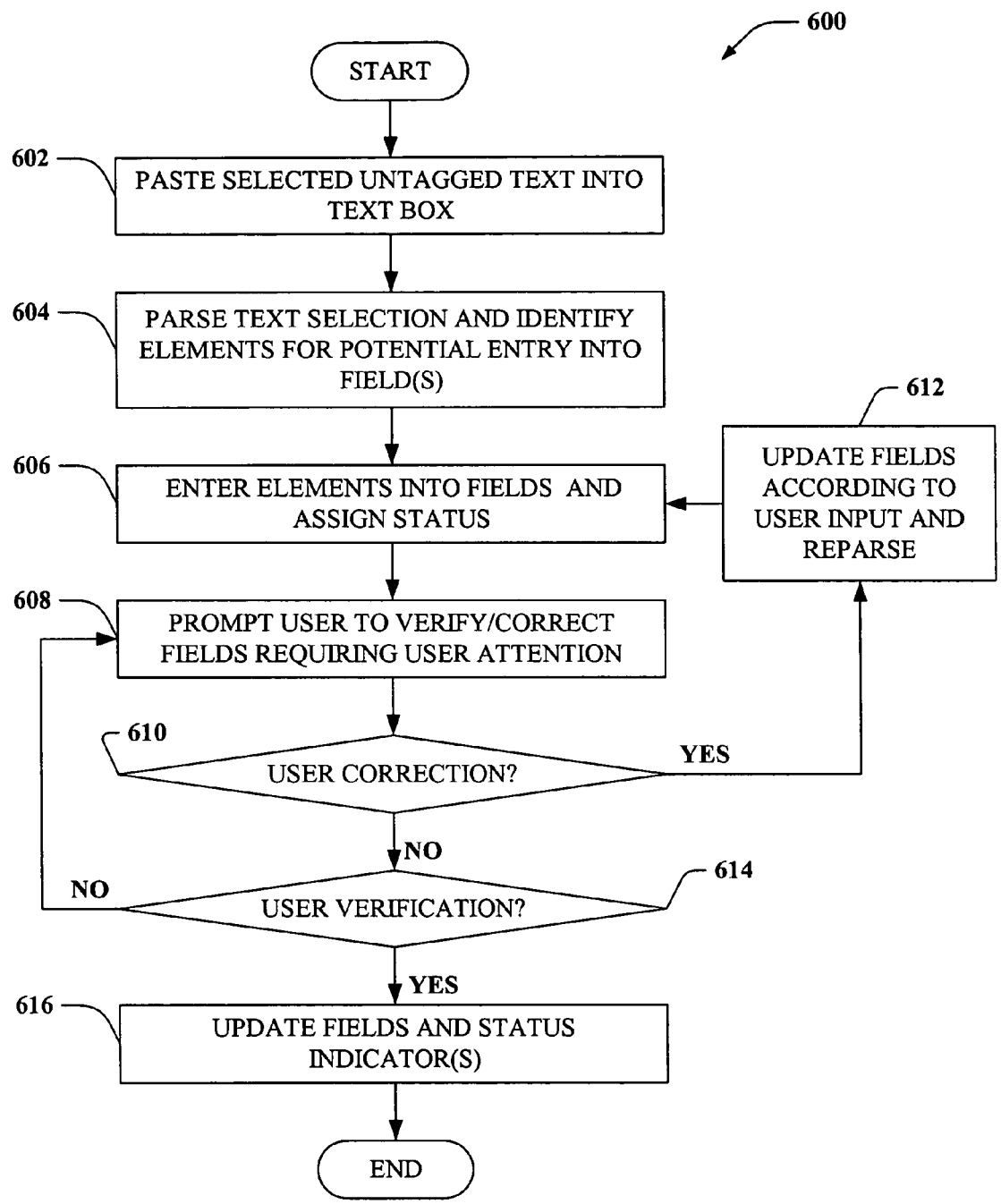
FIG. 6 is an illustration of a methodology 600 in accordance with an aspect of the present invention.

FIG. 6 is an illustration of a methodology 600 for automatic form filling assistance in accordance with an aspect of the present invention. At 602, selected untagged media is inserted into a text box in an untagged media GUI. At 604, inserted media is parsed to determine elements that can potentially be utilized to populate specific fields in a form. Statuses can be assigned to elements entered into fields and indicated to a user at 606. For example, selected untagged media such as "John Smith and Jane Doe will be at the convention next weekend" contains two first names and two last names. If "John" is used to populate a "First Name" field in, for example, a contact list, then it can have associated with it a status indicator (e.g., "filled but unverified") that can alert a user to the fact that "John" may not be a correct (e.g., desired) entry in the first name field. Additionally, "Jane" can be made available to the user via a drop-down menu to facilitate potential user correction of the First Name field. The indicator can be, for example, a color coded status indicator "light" next to the First Name field. To further this example, a red-yellow-green protocol can be employed to indicate varied status levels, wherein red indicates that a field is unfilled and unverified, yellow indicates that a field is filled but unverified, and green indicates that a field is filled (either automatically or by the user) and verified. In the present example, the First Name field can have a yellow status indicator, indicating that the First Name field is filled, but that the first name "John" has not been verified.

At 608, the user is prompted to verify and/or correct form fields, and particularly form fields exhibiting anything less than, for example, green status (e.g., in the exemplary scenario where green indicates filled and verified status). Then, at 610, a determination is made regarding whether the user has corrected (e.g., altered) any information. According to the present example, if "John" is not the desired entry in field "First Name," then the user can click on "Jane" in the text box and drag "Jane" into the First Name field to correct the entry. Additionally, "Jane" can be selected form a drop down menu already presented in the First Name field. If the user has corrected any information, then the method can proceed to 612 where field(s) can be updated according to user input and untagged text can be reparsed. The method can then revert to 606 for status upgrading and entry of data into form fields, which can occur with regard to user input. If the user does not correct information at 610, then a determination can be made at 614 regarding whether the user has verified field entries. If the user has not verified field entries at 614, then the method can revert to 608 for further prompting of the user to take action on a field entry exhibiting a status other than "filled and verified." If the user verifies accurate information at 614, then other fields and their corresponding status indications can be updated at 616. For example, if "John" is the desired entry for the First Name field, then at 616 an indicator status can be upgraded from yellow to green.

Figure 7:
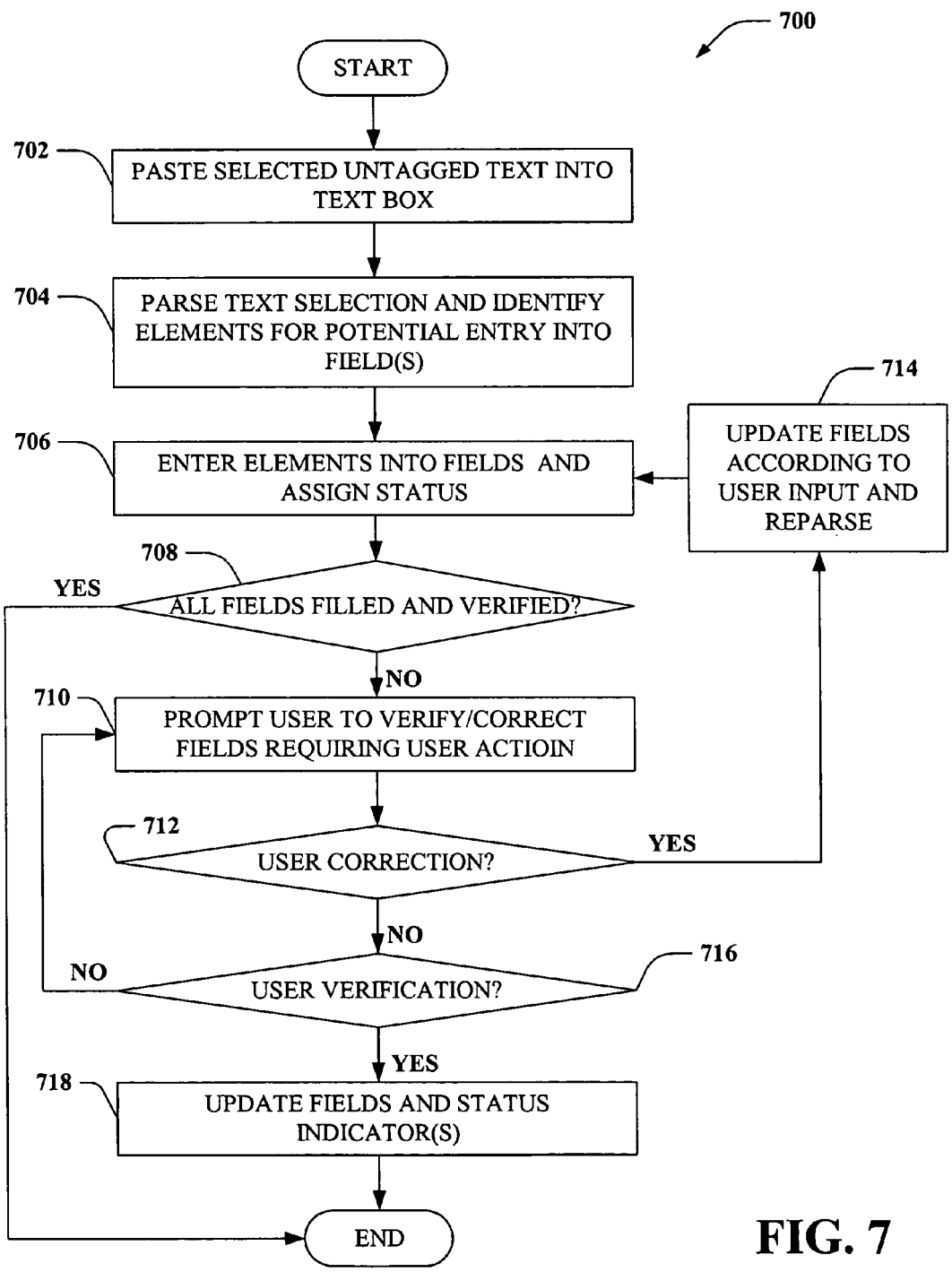
FIG. 7 is an illustration of a methodology 700 in accordance with an aspect of the present invention.

FIG. 7 illustrates a methodology 700 in accordance with an aspect of the present invention that facilitates assisting a user in filling a form. At 702, selected untagged media is pasted into a text box in a form filling interface. At 704, the untagged media is parsed to identify potential elements (e.g., names, addresses, phone numbers, . . . ) that can be utilized to populate fields in a form. Elements can be entered, and statuses can be associated with entered elements and displayed to a user to indicate whether a particular entry is properly inserted into an associated field at 706. At 708, a determination is made regarding whether all fields exhibit a highest possible status (e.g., whether all fields are "filled and verified"). If all fields display the "filled and verified" indication at 708, then the user need not be prompted to take action and the methodology can terminate. However, if any field exhibits less than a "filled and verified" status, then the method can proceed to 710, where the user is prompted to correct and/or verify any suspect fields. At 712, a determination can be made as to whether the user has corrected a field entry. If so, then at 714, form fields can be updated according to user input and the text box can be reparsed, before reverting to 706 for status upgrade and element entry into fields. If it is determined that the user has not corrected any field at 712, then at 714 a determination is made regarding whether the user has verified suspect field(s). If the user has not verified fields with less-than-desired status, then the method can revert to 710, for further prompting of the user to take action. If, at 716, it is determined that the user has verified the suspect information, then at 718 fields can be updated and statuses associated there with can be upgraded.

Figure 8:
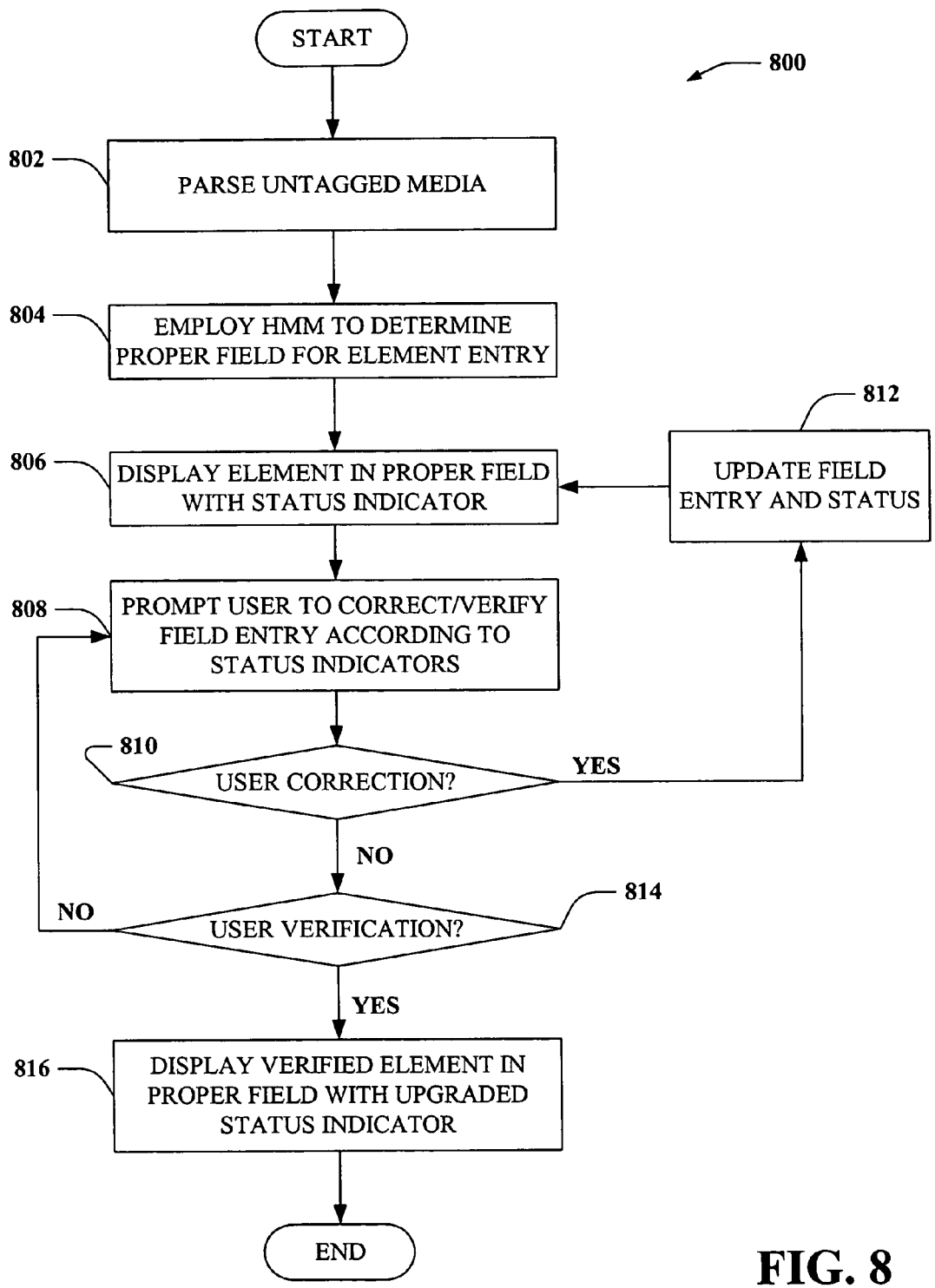
FIG. 8 is an illustration of a methodology 800 in accordance with an aspect of the present invention.

FIG. 8 is an illustration of a methodology 800 in accordance with an aspect of the present invention. According to the methodology, at 802, untagged media is parsed. At 804, hidden Markov models (HMM) are employed to determine a proper field into which a particular element can be entered. At 806, element(s) are displayed in the determined proper fields with a status indicator. A user can be prompted at 808 to verify and/or correct information entered in the field(s). At 810, a determination is made regarding whether user correction has been detected. If so, then at 812 the user-corrected field(s), along with other fields corrected via correction propagation, can be updated and status upgraded accordingly. The method can then revert to 806 where elements are displayed and status is indicated in accordance with user input. If correction is not detected at 810, then at 814, a determination is made regarding whether user verification has occurred. If the user has not verified entered information to be correct, then the method can revert to 808 for further prompting of the user to take action. If, at 814, it is determined that the user has verified information in a suspect field to be correct, then the method can proceed to 816, where the verified element is displayed in the proper field and upgraded status is displayed.

Figure 9:
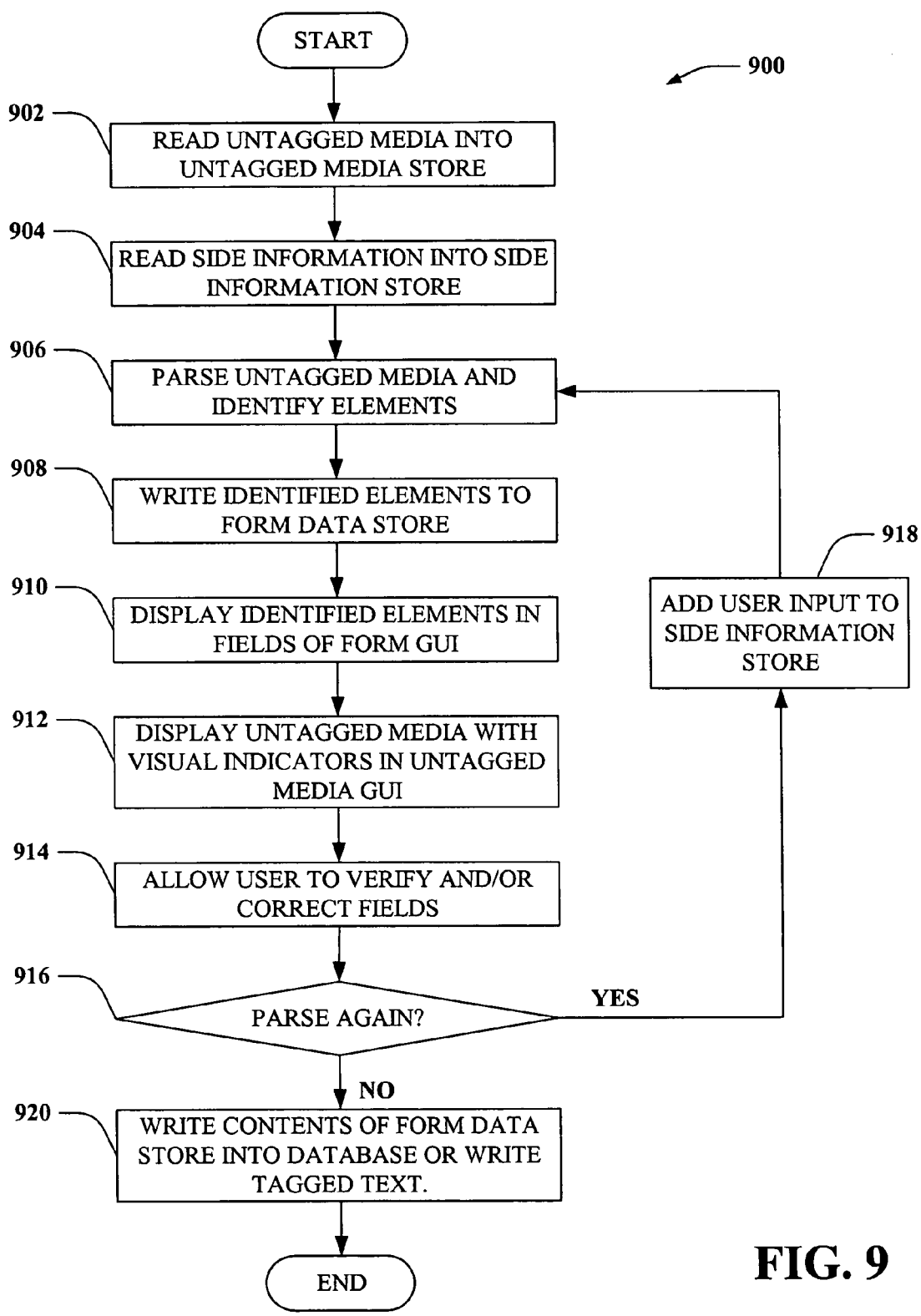
FIG. 9 is an illustration of a methodology 900 in accordance with an aspect of the present invention.

FIG. 9 is an illustration of a methodology 900 in accordance with an aspect of the present invention. At 902, untagged media is read into an untagged media store. At 904, side information (e.g., information gleaned from user action such as data entry, verification, correction, . . . ) is read into a side information store. At 906, untagged media can be parsed to identify elements that can potentially populate form fields. Identified elements can be written to a form data store at 908. Then, at 910, identified elements can be displayed to a user in form fields in a form GUI. At 912, untagged media in the untagged media GUI can be displayed with visual indicators that facilitate assisting the user in filling the form fields. For example, first names in the text box can be color-coded in a specific color (e.g., orange) in order to indicate that they can be entered in a First Name field in the form GUI, which is also color-coded in orange. According to another example, parsed untagged text comprising a "@" symbol can be coded in, for example, blue, to indicate that such text may be entered in an "email" field in the form GUI, which can also be colored blue.

At 914 the user can be prompted to verify and/or correct assignments of elements to fields in the form GUI. Then, at 916 a decision can be made to parse the untagged media again. If such a decision is made, then at 918, user input is added to the side information store, and the system can revert to 906 for reiteration of untagged media parsing and element identification. If it is determined that no additional parsing is required at 916, then at 920, the contents of the form data store can be written into a database or file.

Figure 10:
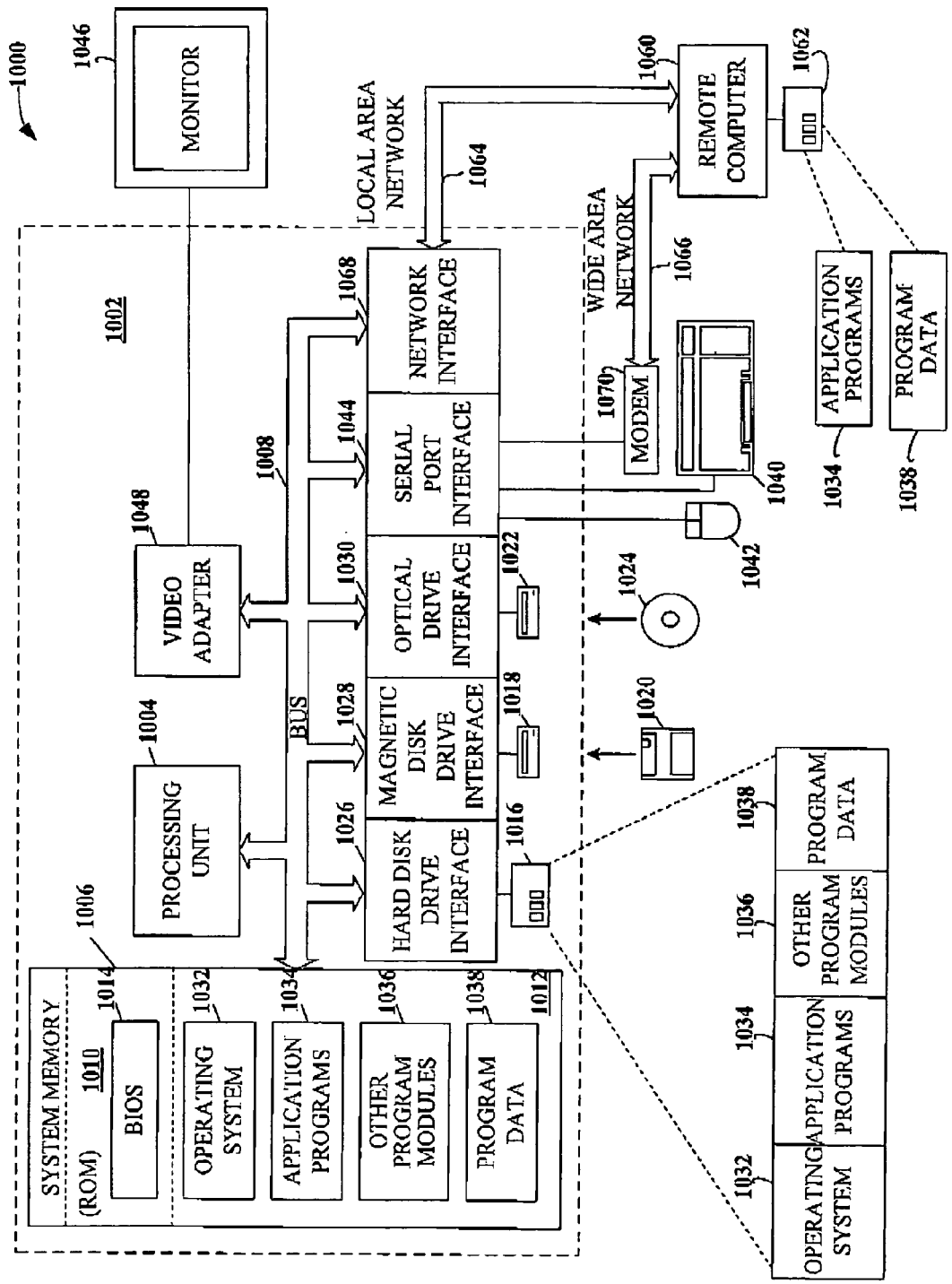
FIGS. 10 and 11 are illustrations of exemplary computing environments 1000 and 1100 in accordance with an aspect of the present invention.
Figure 11:
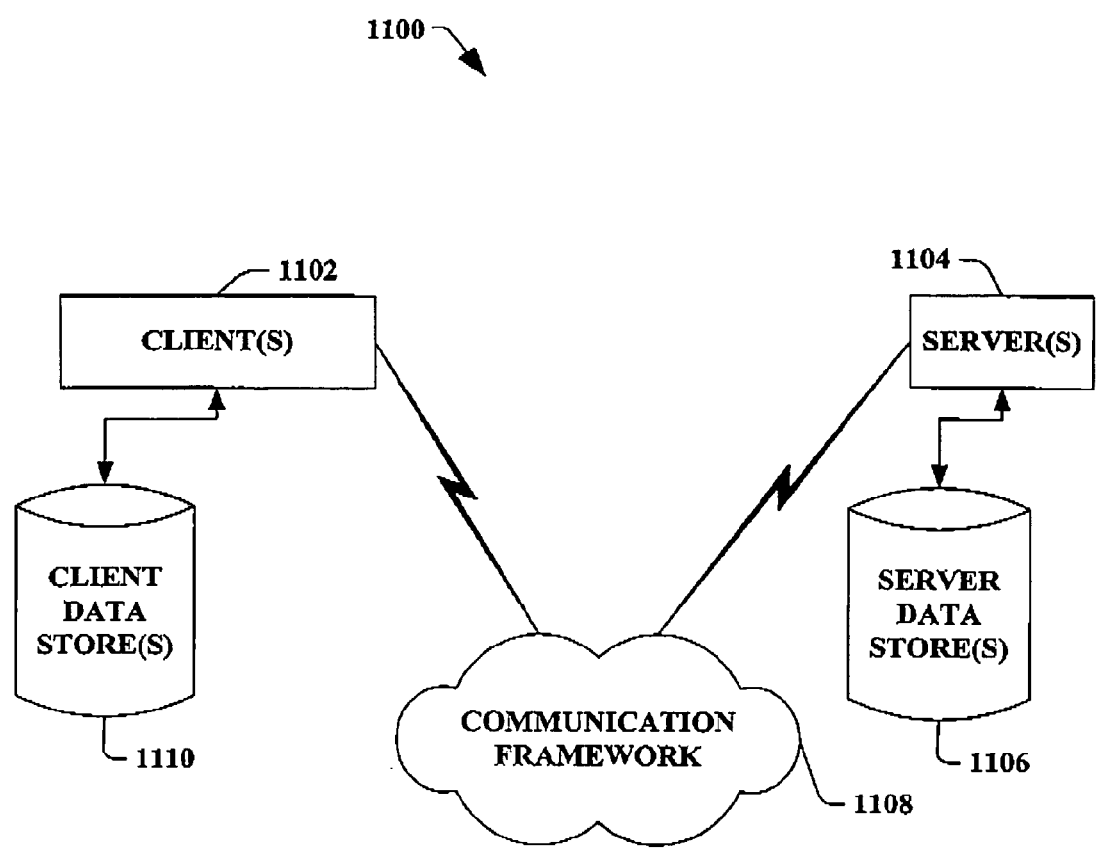

In order to provide additional context for implementing various aspects of the present invention, FIGS. 10 and 11, and the following discussion are intended to provide a brief, general description of a suitable computing environment 1000 in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

With reference to FIG. 10, an exemplary system environment 1000 for implementing the various aspects of the invention includes a conventional computer 1002, including a processing unit 1004, a system memory 1006, and a system bus 1008 that couples various system components, including the system memory, to the processing unit 1004. The processing unit 1004 may be any commercially available or proprietary processor. In addition, the processing unit may be implemented as multi-processor formed of more than one processor, such as may be connected in parallel.

The system bus 1008 may be any of several types of bus structure including a memory bus or memory controller, a peripheral bus, and a local bus using any of a variety of conventional bus architectures such as PCI, VESA, Microchannel, ISA, and EISA, to name a few. The system memory 1006 includes read only memory (ROM) 1010 and random access memory (RAM) 1012. A basic input/output system (BIOS) 1014, containing the basic routines that help to transfer information between elements within the computer 1002, such as during start-up, is stored in ROM 1010.

The computer 1002 also may include, for example, a hard disk drive 1016, a magnetic disk drive 1018, e.g., to read from or write to a removable disk 1020, and an optical disk drive 1022, e.g., for reading from or writing to a CD-ROM disk 1024 or other optical media. The hard disk drive 1016, magnetic disk drive 1018, and optical disk drive 1022 are connected to the system bus 1008 by a hard disk drive interface 1026, a magnetic disk drive interface 1028, and an optical drive interface 1030, respectively. The drives 1016, 1018, and 1022, and their associated computer-readable media provide nonvolatile storage of data, data structures, computer-executable instructions, etc. for the computer 1002. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 1000, and further that any such media may contain computer-executable instructions for performing the methods of the present invention.

A number of program modules may be stored in the drives 1016, 1018, and 1022, and RAM 1012, including an operating system 1032, one or more application programs 1034, other program modules 1036, and program data 1038. The operating system 1032 may be any suitable operating system or combination of operating systems. By way of example, the application programs 1034 and program modules 1036 can include facilitating client-based web-crawling in accordance with an aspect of the present invention.

A user can enter commands and information into the computer 1002 through one or more user input devices, such as a keyboard 1040 and a pointing device (e.g., a mouse 1042). Other input devices (not shown) may include a microphone, a joystick, a game pad, a satellite dish, wireless remote, a scanner, or the like. These and other input devices are often connected to the processing unit 1004 through a serial port interface 1044 that is coupled to the system bus 1008, but may be connected by other interfaces, such as a parallel port, a game port or a universal serial bus (USB). A monitor 1046 or other type of display device is also connected to the system bus 1008 via an interface, such as a video adapter 1048. In addition to the monitor 1046, the computer 1002 may include other peripheral output devices (not shown), such as speakers, printers, etc.

It is to be appreciated that the computer 1002 can operate in a networked environment using logical connections to one or more remote computers 1060. The remote computer 1060 may be a workstation, a server computer, a router, a peer device or other common network node, and typically includes many or all of the elements described relative to the computer 1002, although, for purposes of brevity, only a memory storage device 1062 is illustrated in FIG. 10. The logical connections depicted in FIG. 10 can include a local area network (LAN) 1064 and a wide area network (WAN) 1066. Such networking environments are commonplace in offices, enterprise-wide computer networks, intranets and the Internet.

When used in a LAN networking environment, for example, the computer 1002 is connected to the local network 1064 through a network interface or adapter 1068. When used in a WAN networking environment, the computer 1002 typically includes a modem (e.g., telephone, DSL, cable, . . . ) 1070, or is connected to a communications server on the LAN, or has other means for establishing communications over the WAN 1066, such as the Internet. The modem 1070, which can be internal or external relative to the computer 1002, is connected to the system bus 1008 via the serial port interface 1044. In a networked environment, program modules (including application programs 1034) and/or program data 1038 can be stored in the remote memory storage device 1062. It will be appreciated that the network connections shown are exemplary and other means (e.g., wired or wireless) of establishing a communications link between the computers 1002 and 1060 can be used when carrying out an aspect of the present invention.

In accordance with the practices of persons skilled in the art of computer programming, the present invention has been described with reference to acts and symbolic representations of operations that are performed by a computer, such as the computer 1002 or remote computer 1060, unless otherwise indicated. Such acts and operations are sometimes referred to as being computer-executed. It will be appreciated that the acts and symbolically represented operations include the manipulation by the processing unit 1004 of electrical signals representing data bits which causes a resulting transformation or reduction of the electrical signal representation, and the maintenance of data bits at memory locations in the memory system (including the system memory 1006, hard drive 1016, floppy disks 1020, CD-ROM 1024, and remote memory 1062) to thereby reconfigure or otherwise alter the computer system's operation, as well as other processing of signals. The memory locations where such data bits are maintained are physical locations that have particular electrical, magnetic, or optical properties corresponding to the data bits.

FIG. 11 is another block diagram of a sample computing environment 1100 with which the present invention can interact. The system 1100 further illustrates a system that includes one or more client(s) 1102. The client(s) 1102 can be hardware and/or software (e.g., threads, processes, computing devices). The system 1100 also includes one or more server(s) 1104. The server(s) 1104 can also be hardware and/or software (e.g., threads, processes, computing devices). The servers 1104 can house threads to perform transformations by employing the present invention, for example. One possible communication between a client 1102 and a server 1104 can be in the form of a data packet adapted to be transmitted between two or more computer processes. The system 1100 includes a communication framework 1108 that can be employed to facilitate communications between the client(s) 1102 and the server(s) 1104. The client(s) 1102 are operably connected to one or more client data store(s) 1110 that can be employed to store information local to the client(s) 1102. Similarly, the server(s) 1104 are operably connected to one or more server data store(s) 1106 that can be employed to store information local to the servers 1104.

In one instance of the present invention, a data packet transmitted between two or more computer components that facilitate web-crawling, the data packet is comprised of, at least in part, information relating to web-crawling that utilizes, at least in part, a distributed system for web-crawling.

In another instance of the present invention, a computer readable medium storing computer executable components of a system for facilitating web-crawling is comprised of, at least in part, a web-crawling system that determines, at least in part, information pertaining to web pages compiled by a distributed system for web-crawling.

It is to be appreciated that the systems and/or methods of the present invention can be utilized in web-crawling systems facilitating computer components and non-computer related components alike. Further, those skilled in the art will recognize that the systems and/or methods of the present invention are employable in a vast array of electronic related technologies, including, but not limited to, computers, servers and/or handheld electronic devices and the like which can be wired and/or wireless and the like.

One skilled in the art will also appreciate that the present invention can be utilized not only for server to client based crawling systems but also for peer-to-peer crawling systems. It is also possible that a client can perform tasking typically associated with "server" behavior and thus transfer some characteristics associated with the server to the client in some instances of the present invention. An example of one instance of the present invention is a client that performs "sub-crawls" to other clients to ascertain and/or retrieve information to send to a server. This instance can be beneficial, for example, in networks that have bottlenecks between certain clients and a server. Data can be transferred to a client with the best access to the server. In other instances of the present invention, a client can exhibit server behavior by initiating sub-crawls in an intranet system, thus reporting out information to a server from only a single and/or substantially reduced number of clients present on the intranet. In this manner a search server can initiate multiple sub-crawls in clients to expand its crawling resources.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system that facilitates assisted form filling, comprising:
  a control component that receives untagged textual information;
  a parsing component that parses the untagged textual information to locate one or more identified elements of information based in part on information requirements of a plurality of fields of a form, and populates the plurality of fields of the form by automatically inserting the one or more identified elements in respective fields of the form to facilitate entry of information related to at least one of a person or an entity, or a combination thereof, into the form, the parsing component re-parses the untagged textual information after a correction of information in at least one field of the plurality of fields and propagates the correction of information in the at least one field to facilitate locating at least one other identified element of information in the untagged textual information and automatically inserting the at least one other identified element in the at least one other field of the form based in part on the corrected information; and
  a display component that displays the untagged textual information and the form, so populated.

2. The system of claim 1, the parsing component comprises an artificial intelligence component that makes inferences regarding insertion of the one or more of the identified elements in respective fields of the form, the inferences are based at least in part on the untagged textual information.

3. The system of claim 2, the artificial intelligence component employs hidden Markov models to determine a proper field of the plurality of fields in the form into which one of the one or more identified elements can be inserted.

4. The system of claim 1, the display component employs color to indicate a correlation between at least one of the one or more identified elements and at least one of the plurality of fields in the form.

5. The system of claim 1, further comprising at least one status indicator that indicates a status level associated with at least one of the plurality of fields in the form.

6. The system of claim 5, the at least one status indicator is colored according to a color code that indicates the status level of the at least one of the plurality of fields in the form.

7. A computer-implemented method for assisted form filling comprising:

receiving untagged media;

parsing the untagged media to identify one or more elements, based in part on information requirements of a plurality of fields of a form;

transferring the untagged media associated with the one or more elements into tagged media;

automatically entering each of the one or more elements in its corresponding field of the plurality of fields of the form to facilitate entry of information into the form;

receiving at least one correction of information associated with at least one field of the plurality of fields of the form, the at least one correction of information is entered in the at least one field;

storing the at least one correction of information as side information;

re-parsing the untagged media and the side information after the at least one correction of information associated with the at least one field of the plurality of fields to identify at least one other element, which is automatically entered into at least one other field of the plurality of fields, to propagate the at least one correction of information in the at least one field to the at least one other field to facilitate population of the other fields of the form based in part on the information requirements of the at least one other field and the at least one correction of information;

automatically entering the at least one element in the at least one other field based in part on the at least one correction of information; and displaying the untagged media and the form to a user.

8. The method of claim 7, further comprising employing color to indicate that an element correlates with a particular field in the form.

9. The method of claim 7, further comprising employing at least one hidden Markov model to determine an appropriate field into which an element can be entered.

10. The method of claim 7, further comprising indicating a status level associated with at least one of the one or more elements in at least one of the plurality of fields.

11. The method of claim 10, further comprising prompting the user to at least one of verify or correct at least one of the one or more elements in at least one of the plurality of fields if the status level associated with the at least one of the one or more elements in the at least one of the plurality of fields is below a desired level.

12. The method of claim 11, further comprising updating the form according to at least one of user verification or user correction of the at least one of the one or more elements in the at least one of the plurality of fields.

13. The method of claim 12, further comprising upgrading the status level associated with the at least one of the one or more elements based, at least in part, on at least one of user verification or user correction of the at least one of the one or more elements.

14. The method of claim 11, further comprising employing different colors to indicate different levels of status.

15. The method of claim 7, further comprising storing the form to a data store if confidence levels of all elements in all fields are above a desired confidence threshold.

16. A computer-implemented method for assisting a user to populate a form, comprising:

reading untagged media into an untagged media store;

reading side information into a side information store;

parsing untagged media to identify one or more elements of information, based in part on information requirements of a plurality of fields of a form, to facilitate entry of information into the form;

populating a plurality of fields of the form by automatically inserting each of the one or more elements in its corresponding field on the form;

re-parsing the untagged media after a correction of information associated with an element in at least one field of the plurality of fields to identify at least one other element of information, which is automatically inserted in at least one other field of the form, to propagate the correction of information in the at least one field to the at least one other field to facilitate population of the other fields of the form based in part on the corrected information;

writing the one or more elements to a form data store; and displaying the one or more elements in fields of a form graphical user interface.

17. The method of claim 16, further comprising displaying the untagged media with visual indicators in an untagged media graphical user interface.

18. The method of claim 17, wherein the visual indicators are colors indicating a correlation of at least one of the one or more elements with at least one of the plurality of fields in the form.

19. The method of claim 16, further comprising indicating a confidence level associated with the element populating a given field.

20. The method of claim 19, wherein different status levels are indicated by different colors.

21. The method of claim 19, further comprising allowing a user to correct at least one of the plurality of fields in the form if the at least one of the plurality of fields contains at least one error.

22. The method of claim 21, further comprising adding information gleaned from correction of the at least one of the plurality of fields in the form to the side information store.

23. The method of claim 22, further comprising re-parsing the untagged media after addition of information gleaned from the correction of the at least one of the plurality of fields to propagate the correction of the at least one of the plurality of fields to at least one other field of the plurality of fields.

24. The method of claim 16, further comprising permitting a user to verify that at least one element in at least one of the plurality of fields is correct.

25. The method of claim 24, further comprising adding information gleaned from verification of the at least one of the plurality of fields in the form to the side information store.

26. The method of claim 25, further comprising re-parsing the untagged media after addition of information gleaned from the verification of the at least one of the plurality of fields to propagate the correction of the at least one of the plurality of fields to at least one other field of the plurality of fields.

27. The method of claim 16, further comprising writing the contents of the form data store to a file if no errors are present in the form.

28. A computer-implemented system for reducing errors and time required in form filling, comprising:

means for receiving untagged media input;

means for parsing untagged media based in part on information requirements of a plurality of fields of a form, the means for parsing untagged media re-parses the untagged media after a correction of information in at least one field of the plurality of fields and facilitates propagating the correction of information in the at least one field to at least one other field to facilitate population of the other fields of the form based in part on the corrected information;

means for automatically populating the plurality of fields of the form with corresponding parsed untagged media to facilitate entry of information related to at least of a one person or an entity, or a combination thereof, into the form, the means for automatically populating the plurality of fields of the form populates the at least other field with corresponding re-parsed untagged media based in part on the corrected information; and means for concurrently displaying untagged media and the form so populated.

29. The system of claim 28, further comprising means for indicating a status level associated with at least one field in the form.

30. The system of claim 28, further comprising means for at least one of correcting or verifying at least one field in the form.

31. The system of claim 28, further comprising means for indicating a correlation between parsed untagged media elements and fields in the form.

32. A computer readable medium that has computer executable instructions stored thereon to:

receive untagged media;

parse untagged media to identify elements based in part on information requirements of a plurality of fields of a form;

automatically populate fields in a form with corresponding identified elements to facilitate entry of information related to at least one of a person or an entity, or a combination thereof, into the form;

indicate a status associated with populated fields in the form;

permit correction and/or verification of elements in fields in the form; and re-parse the untagged media after a correction of information associated with an element in at least one field of the plurality of fields to identify at least one other element, which is automatically entered into at least one other field, to propagate the correction of information in the at least one field to the at least one other field to facilitate population of the other fields of the form based in part on the corrected information.

\* \* \* \* \*